(12) United States Patent
Hallock

(10) Patent No.: US 6,793,181 B1
(45) Date of Patent: Sep. 21, 2004

(54) ARMREST ASSEMBLY FOR AIRCRAFT

(76) Inventor: Timothy P. Hallock, 5224 Colony Dr., Camarillo, CA (US) 93012

( * ) Notice: Subject to any disclaimer, the term of this patent is extended or adjusted under 35 U.S.C. 154(b) by 0 days.

(21) Appl. No.: 10/625,222

(22) Filed: Jul. 22, 2003

(51) Int. Cl.$^7$ .................................................. B64C 1/14
(52) U.S. Cl. .............................. 244/129.1; 244/129.5; 296/146.7; 49/502
(58) Field of Search ................ 244/118.5, 129.1–129.5; 296/153, 146.6–146.7; D12/195; 49/502

(56) References Cited

U.S. PATENT DOCUMENTS

| | | | | |
|---|---|---|---|---|
| 3,015,516 A | * | 1/1962 | Clark .......................... | 296/153 |
| 3,791,693 A | * | 2/1974 | Hellriegel et al. ....... | 296/146.7 |
| 4,456,644 A | * | 6/1984 | Janz et al. .................... | 428/158 |
| 4,541,595 A | * | 9/1985 | Fiala et al. ............... | 244/129.3 |
| 5,044,578 A | * | 9/1991 | White et al. ................. | 244/119 |
| 5,904,002 A | * | 5/1999 | Emerling et al. .............. | 49/502 |
| 6,183,038 B1 | * | 2/2001 | Hansen et al. ........... | 296/146.7 |
| 6,409,250 B1 | * | 6/2002 | Schultheiss .............. | 296/146.7 |
| 6,565,142 B1 | * | 5/2003 | Gibney et al. ........... | 296/146.7 |

\* cited by examiner

*Primary Examiner*—Galen Barefoot
(74) *Attorney, Agent, or Firm*—Park, Vaughan & Fleming LLP (57) ABSTRACT

An armrest assembly for an aircraft. The armrest assembly includes an insert. The insert includes a flange for coupling to an aircraft interior panel. The insert also includes a protruding portion. The protruding portion includes a cavity. The cavity has a length greater than 12 inches and has a width greater than 2 inches. The armrest assembly also includes an armrest. The armrest is attached to the cavity. The armrest includes an upper surface for supporting the arm of an aircraft pilot or passenger. The armrest's upper surface has a length that is greater than 12 inches and has a width that is greater than 2 inches.

22 Claims, 11 Drawing Sheets

ARMREST ASSEMBLY FOR AIRCRAFT

1. FIELD OF THE INVENTION

The present invention generally relates to an armrest assembly for an aircraft.

2. BACKGROUND

Purchasers of modern aircraft are demanding more amenities in their aircraft, such as a comfortable and aesthetically pleasing interior. However, such interiors add weight to aircraft. Such increase in weight decreases the performance, i.e., the range, speed, and climb rate, of the aircraft. Thus, a need exists for lightweight aircraft interiors that are both comfortable and aesthetically pleasing to aircraft purchasers.

Figure 1A:
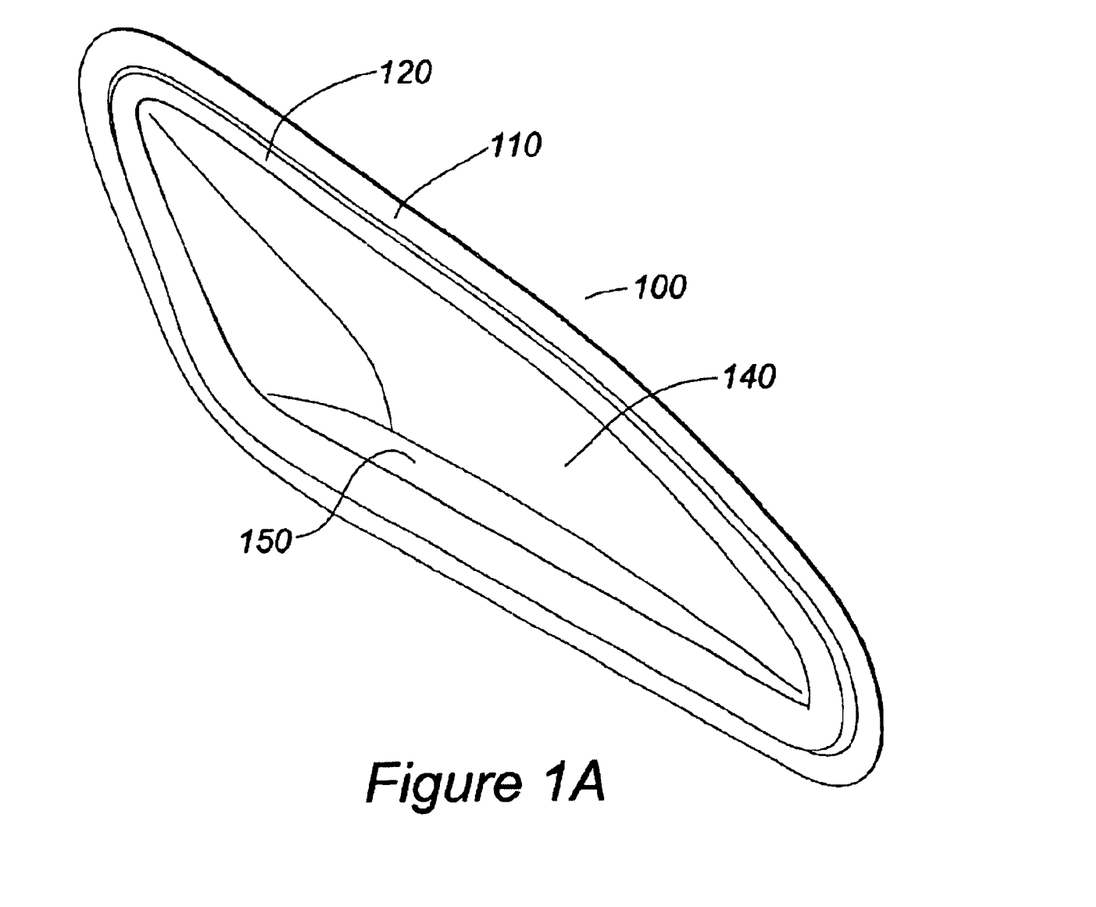
FIG. 1A presents an isometric view of a prior art armrest.
Figure 1B:
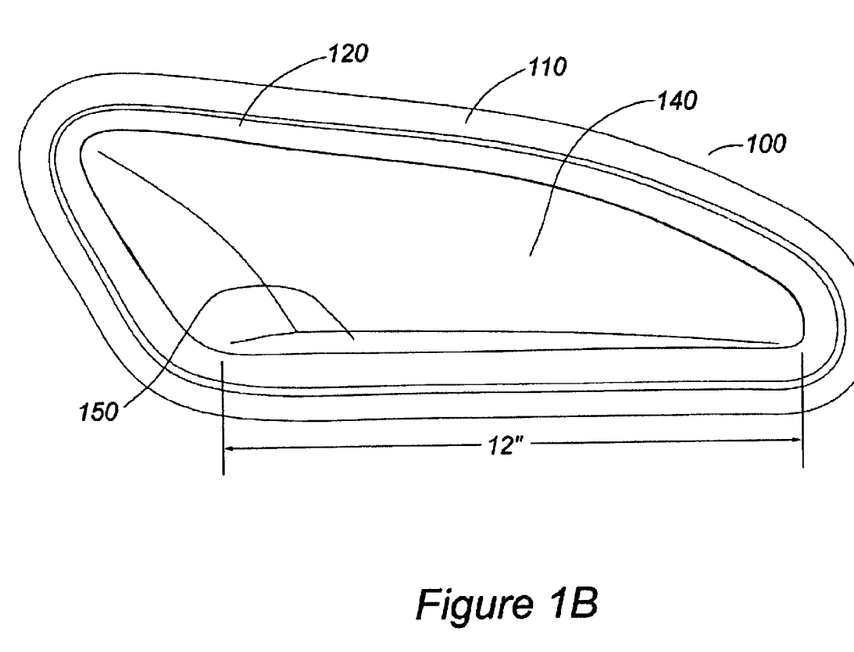
FIG. 1B presents a front view of the prior art armrest of FIG. 1A.
Figure 1C:
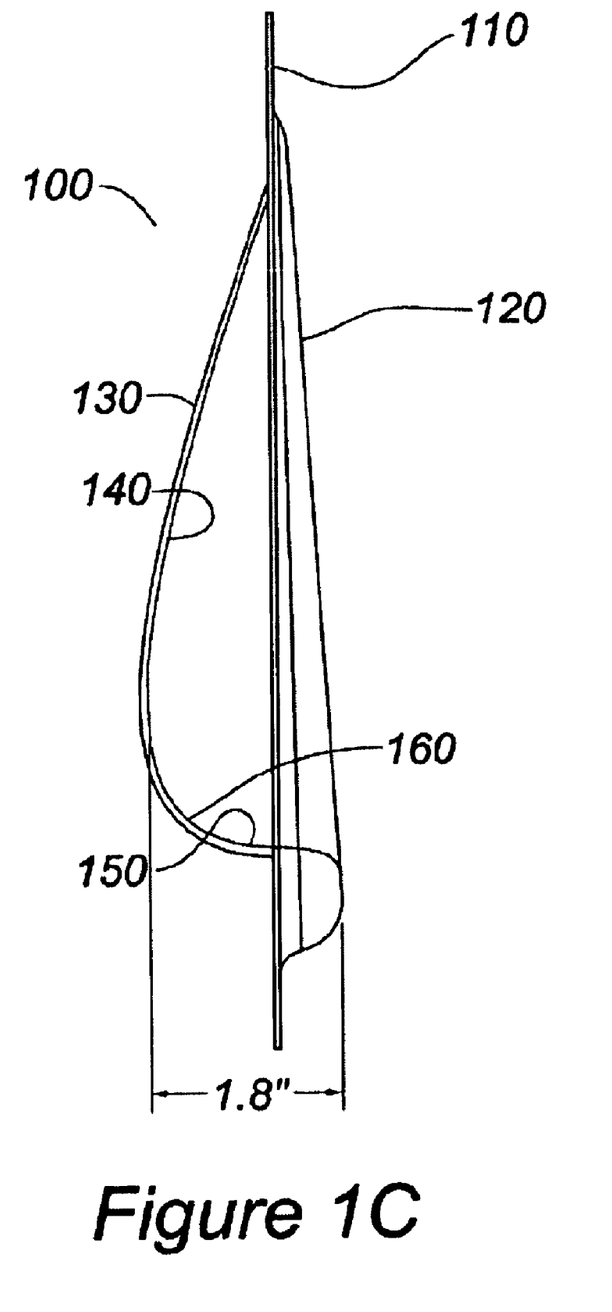
FIG. 1C presents a side view of the prior art armrest of FIG. 1A.

One function of aircraft interiors is to provide a comfortable surface to rest a pilot's or passenger's arm. One prior art armrest 100 is shown in FIGS. 1A–1C. As shown in FIG. 1A, this armrest 100 contains a flange 110 that is designed to couple to the rear surface of an aircraft interior panel. Just inside of the flange 110, the armrest 100 contains a protruding portion 120. The protruding portion 120 is designed to fit within an opening in an aircraft interior panel.

As shown in FIG. 1C, the armrest 100 also includes a recessed portion 130. The recessed portion 130 includes a rear surface 140 and a lower surface 150. (The rear surface 140 and lower surface 150 would normally be hidden in FIG. 1C. However, for clarity, the rear surface and lower surface is shown as a solid line in FIG. 1C.) As shown in FIG. 1B, the length of the lower surface 150 is approximately 12 inches. An aircraft pilot or passenger can rest a portion of his or her arm on the lower surface 150. In order to make the armrest 100 aesthetically pleasing, the armrest 100 is typically covered with a covering such as leather.

The armrest 100 is not optimal. First, the length of the lower surface 150 does not allow an adult pilot or passenger to rest his or her entire arm, including his or her hand, on the armrest 100. Instead, only a portion of an adult's arm can be rested on the lower surface 150 of the armrest 100. Thus, the armrest 100 does not support an adult user's hand as well as his arm. Further, as shown in FIG. 1C, the width of the lower surface 150 is only 1.8 inches. Thus, a user could not comfortably rest his or her arm on the lower surface 150.

Second, the armrest 100 is difficult to cover with an aesthetically pleasing covering such as leather. As shown in FIG. 1C, the interface between the rear surface 140 and the lower surface 150 creates a concave surface 160 with a small radius. It is difficult to cover the concave surface 160 with an aesthetically pleasing covering such as leather because of the small radius of the concave surface 160. As users of the aircraft utilize the armrest 100, the covering over the concave surface 160 can detach from the concave surface 160. Such a detachment significantly detracts from the aesthetics of the armrest.

Thus, a need exists for an improved armrest for aircraft.

3. SUMMARY OF THE INVENTION

One embodiment of the invention is an armrest assembly for an aircraft. The armrest assembly includes an insert. The insert includes a flange for coupling to an aircraft interior panel. The insert also includes a protruding portion. The protruding portion includes a cavity. The cavity has a length greater than 12 inches and has a width greater than 2 inches. The armrest assembly also includes an armrest. The armrest is attached to the cavity. The armrest includes an upper surface for supporting the arm of an aircraft pilot or passenger. The armrest's upper surface has a length that is greater than 12 inches and has a width that is greater than 2 inches.

5. DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

5.1 Armrest Assembly with Recessed Section for Aircraft

Figure 2:
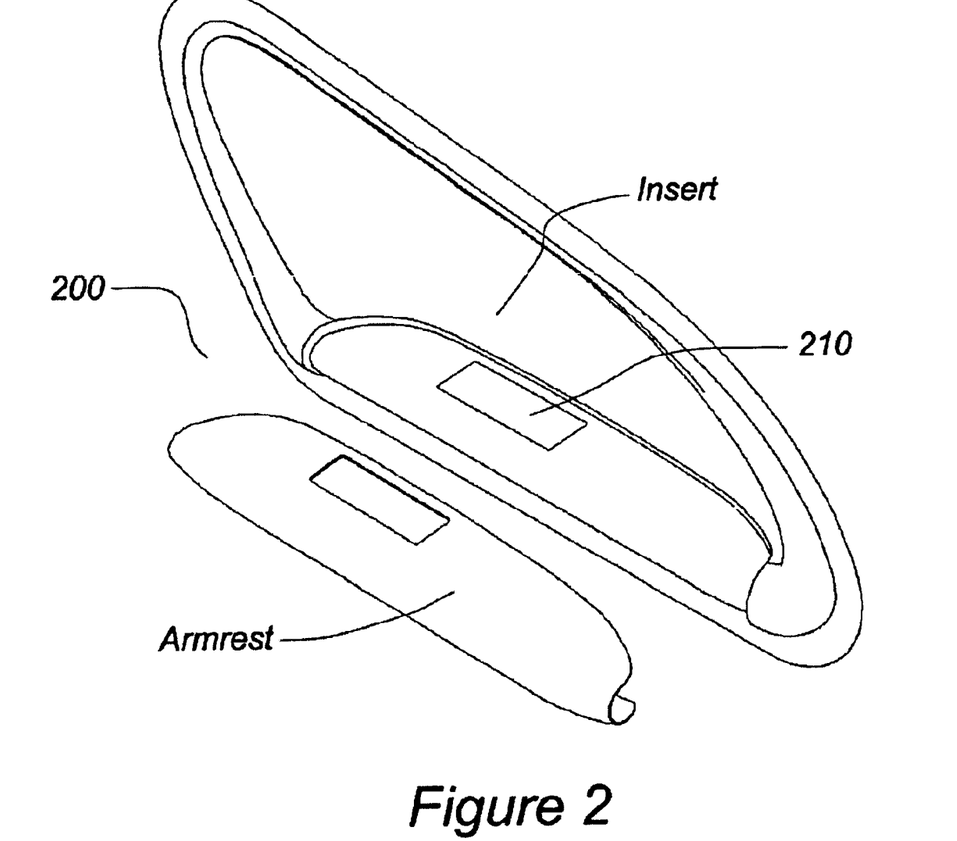
FIG. 2 presents an isometric view of an armrest assembly.

One embodiment of the invention is an armrest assembly 200, which is shown in FIG. 2. The armrest assembly 200 includes a separate insert and armrest. The insert and the armrest are attached to each other by fasteners, such as screws and/or rivets, adhesives, or combinations of adhesives and fasteners. Thus, the armrest and the insert can be assembled separately.

5.2 Insert with Recessed Section for Aircraft

Figure 3A:
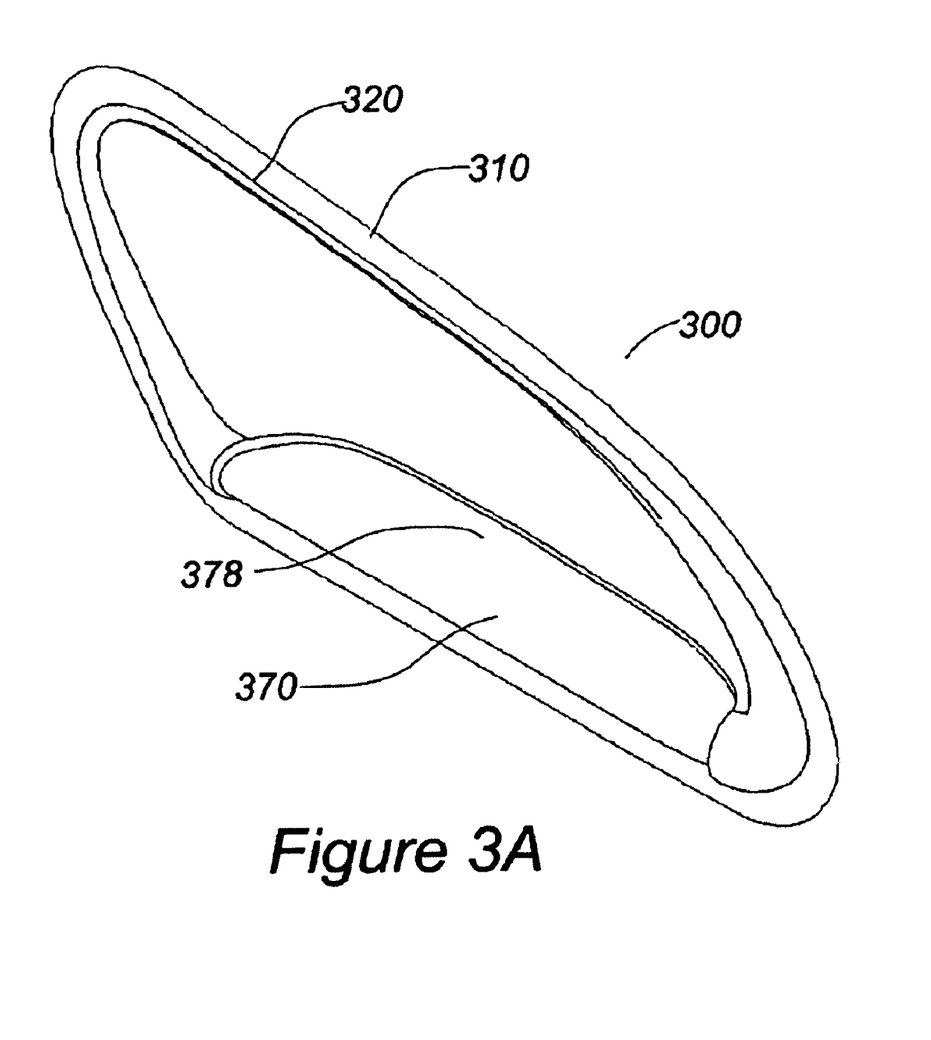
FIG. 3A presents an isometric view of an insert that includes a recessed portion.
Figure 3B:
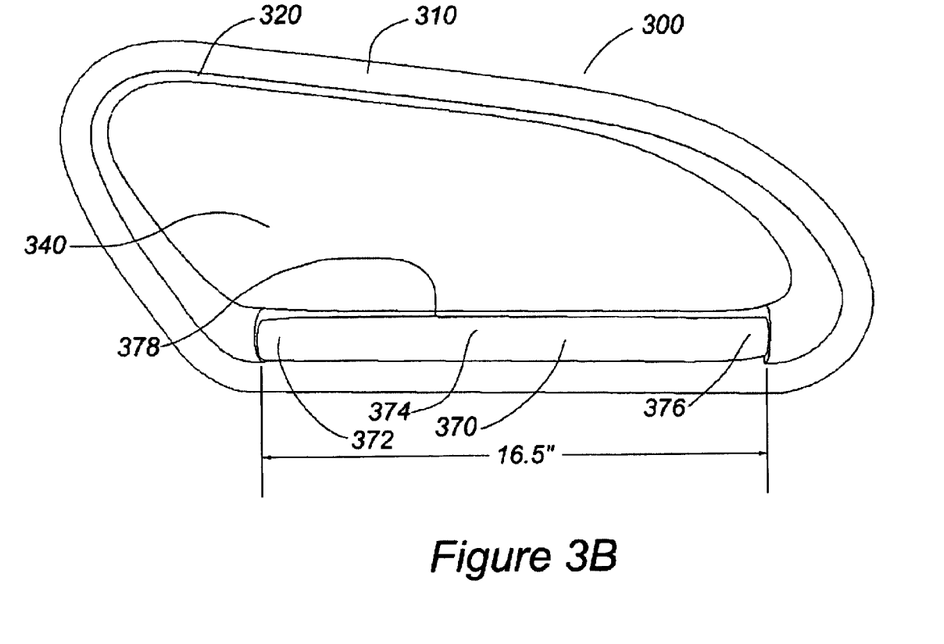
FIG. 3B presents a front view of the insert of FIG. 3A.
Figure 3C:
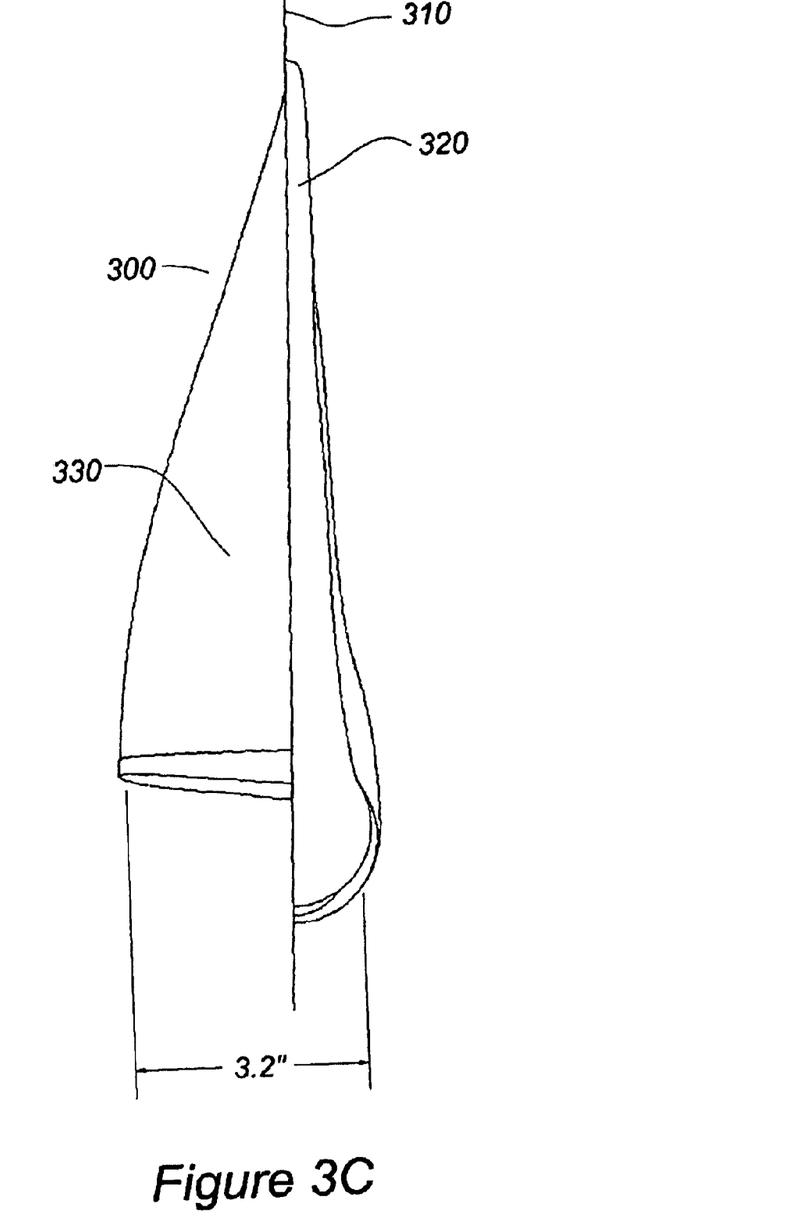
FIG. 3C presents a side view of the insert of FIG. 3A.

A more detailed drawing of the insert of FIG. 2 is shown in FIGS. 3A, 3B, and 3C. As shown in FIG. 3A, the insert 300 contains a flange 310, that is designed to couple to the rear surface of an aircraft interior panel. Just inside the flange 310, the panel contains a protruding portion 320 that is designed to fit within an opening in an aircraft interior panel. As shown in FIG. 3A, the protruding portion is tapered. In other words, the height of the protruding portion 320 is greater at the bottom of the insert 300 than the height of the protruding portion 320 at the top of the insert 300.

As shown in FIG. 3C, the insert 300 includes a recessed portion 330. As shown in FIG. 3B, the recessed portion 330 includes a rear surface 340. In some embodiments of the invention, the recessed portion 330 can be a smooth contoured surface that is aesthetically pleasing to aircraft users.

As shown in FIG. 3B, the insert 300 also includes a cavity 370 for receiving the armrest shown in FIG. 2. In some embodiments of the invention, the cavity 370 has a length of 16.5 inches. In other embodiments of the invention, the length of the cavity 370 is between 13 and 24 inches. In other embodiments of the invention, the cavity 370 has a width of 3.2 inches. In still other embodiments of the invention, the width of the cavity 370 is between 2 and 6 inches.

In some embodiments of the invention, the depth of the cavity 370 is equal to the depth of the armrest shown in FIG. 2. In other embodiments of the invention, the depth of the cavity 370 is greater than the thickness of the armrest. In such embodiments, the depth of the cavity 370 may be equal to or greater than the thickness of the armrest plus the thickness of the covering that covers the insert 300 plus two times the thickness of the covering that covers the armrest.

As shown in FIG. 3B, the cavity 370 may have a tapered rear portion 372, a center portion 374, and a tapered forward portion 376. In addition, the cavity 370 may include an upper surface 378. In some embodiments of the invention, such as shown in FIG. 2, the upper surface 378 of the insert 300 includes a cutout 210 for receiving a finger grip (not shown) for shutting an aircraft door. In other embodiments of the invention, such as shown in FIGS. 3A–3C, the upper surface 378 does not include a cutout for a finger grip.

The insert 300 can be molded from any moldable material, such as from many common plastics. Alternatively, the insert 300 can be constructed out of fiberglass, E-glass, S-glass, or carbon fiber. In some embodiments of the invention, the thickness of the insert 300 can be equal to or less than 0.1".

In order to make the insert 300 aesthetically pleasing to users of an aircraft, the insert 300 may be covered with a covering such as leather.

Inserts with a recessed portion 330 are particularly useful in aircraft that are manufactured by Raytheon Airplane Company and homebuilt aircraft with rounded fuselage sides.

5.3 Armrest

Figure 4:
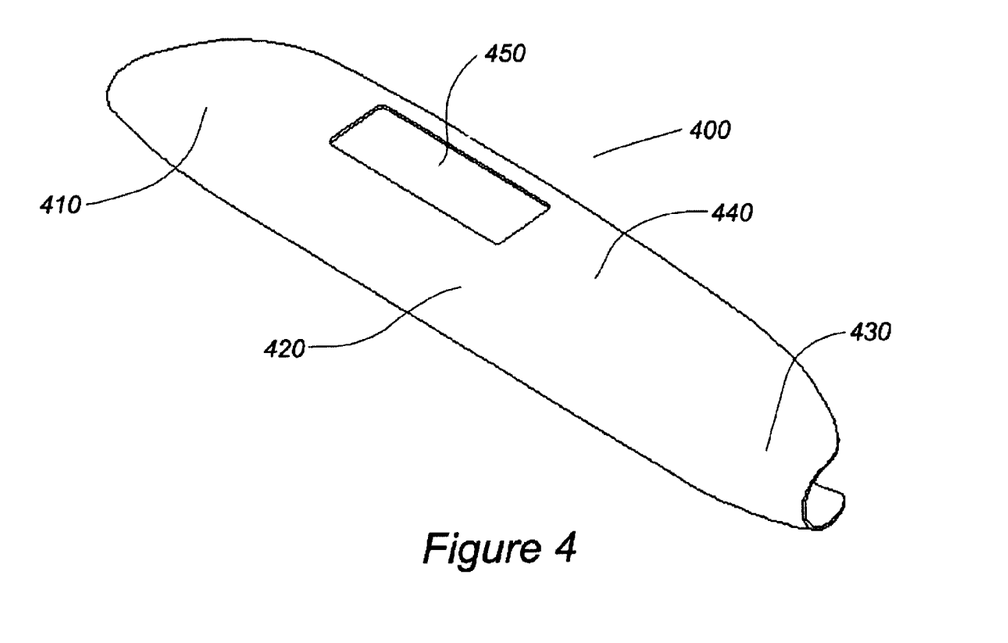
FIG. 4 presents an isometric view of an armrest.

A more detailed drawing of the armrest of FIG. 2 is shown in FIG. 4. In some embodiments of the invention, such as shown in FIG. 4, the armrest 400 includes a tapered rear portion 410. The inner surface of the tapered rear portion 410 is intended to be attached to the tapered rear portion 372 of the insert 300. The armrest 400 shown in FIG. 4 also includes a center portion 420. The inner surface of the center portion 420 is intended to be attached to the center portion 374 of the insert 300. The armrest 400 shown in FIG. 4 further includes a tapered forward portion 430. The inner surface of the forward portion 430 is intended to be attached to the tapered forward portion 376 of the insert 300.

The armrest 400 shown in FIG. 4 also includes an upper portion 440. The length and width of the upper portion 440 are slightly less than the length and width of the cavity 370 of the insert 300. Thus, the upper portion 440 is large enough to support an adult's entire arm. In some embodiments of the invention, the armrest 400 includes a cutout 450 for receiving a finger grip (not shown). The cutout 450 in the armrest 400 is intended to align with the cutout 210 in the insert shown in FIG. 2.

The armrest 400 can be molded from any moldable material, such as from many common plastics. Alternatively, the armrest 400 can be constructed out of fiberglass, E-glass, S-glass, or carbon fiber. In some embodiments of the invention, the thickness of the armrest 400 can be equal to or less than 0.1".

In order to make the armrest aesthetically pleasing to users of an aircraft, the insert may be covered with a covering such as leather. This covering may be identical to the covering used to cover the insert 300. Alternatively, the covering may be of a lighter or darker color than the covering used to cover the insert 300. Thus, different colors of covers may be utilized to increase the aesthetics of the armrest assembly.

So that the armrest 400 can attach to the cavity 370 of insert 300 after the armrest and the cavity are both covered with coverings, in some embodiments of the invention, the length of the armrest 400 is less than the length of the cavity 370 by at least two times the thickness of the covering that covers the insert 300 and two times the thickness of the covering that covers the armrest 400.

5.4 Assembly of the Armrest Assembly

After the insert and the armrest shown in FIG. 2 have been covered with aesthetically pleasing covers, then the insert and the armrest can be attached utilizing fasteners, adhesives or combinations of the two. In some embodiments of the invention, the armrest can be detached from the insert. For example, if only fasteners are utilized to attach the armrest to the insert, then the armrest and the insert may be easily detached. However, in other embodiments of the invention, once the armrest and the insert are attached, they may not be easily separated.

5.5 Advantages of the Armrest Assembly

The armrest assembly shown in FIG. 2 has many advantages when compared with the prior art. For example, the armrest assembly provides support for the entire arm of an adult, including his or her hand. Thus, the armrest assembly is more comfortable to use than prior art armrests.

Second, the armrest assembly shown in FIG. 2 is easier to cover with aesthetically pleasing coverings such as leather than prior art armrests. The armrest assembly shown in FIG. 2 does not include a concave surface between the rear surface 340 of the insert 300 and the upper portion 440 of the armrest 400 because the insert 300 is separate from the armrest 400. Instead, rear surface 340 of the insert 300 is covered with a covering that extends down to the cavity 370. (In some embodiments of the invention, the covering extends slightly into the cavity 370.) Similarly, the armrest 400 is covered with a covering that extends from the outer surface of the armrest's upper portion 440 to the inner surface of the armrest's upper portion 440. Thus, when the armrest 400 is attached to the insert 300, the covering of the armrest 400 helps secure the covering of the insert 300. As a result, during the use of the armrest assembly, the coverings of the insert 300 and armrest 400 do not become detached.

During the use of the armrest assembly shown in FIG. 2, the covering over the armrest will typically wear out faster than the covering over the insert. Thus, the covering over the armrest will likely need to be replaced more frequently than the covering over the insert, which may not ever need to be replaced. A third advantage of some embodiments of the armrest assembly is that the armrest can be removed from the armrest assembly and separately recovered.

A fourth advantage of the armrest assembly shown in FIG. 2 is that additional padding between the armrest and the armrest covering can be utilized. Thus, the comfort of the armrest can be improved.

A fifth advantage of the armrest assembly shown in FIG. 2 is that the armrest can be utilized to hide fasteners (not shown) that connect the insert to the aircraft. Thus, the stiffness of the armrest assembly can be increased without detracting from the aesthetics of the armrest assembly.

5.6 Insert without a Recessed Section for Aircraft

Figure 5A:
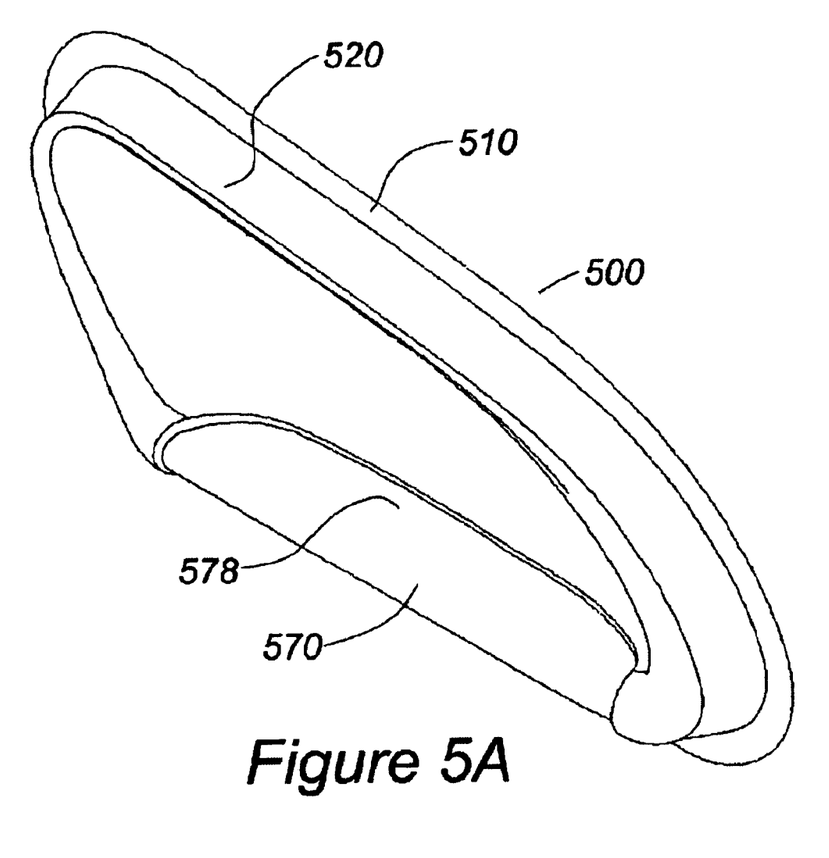
FIG. 5A presents an isometric view of an insert that does not include a recessed portion.
Figure 5B:
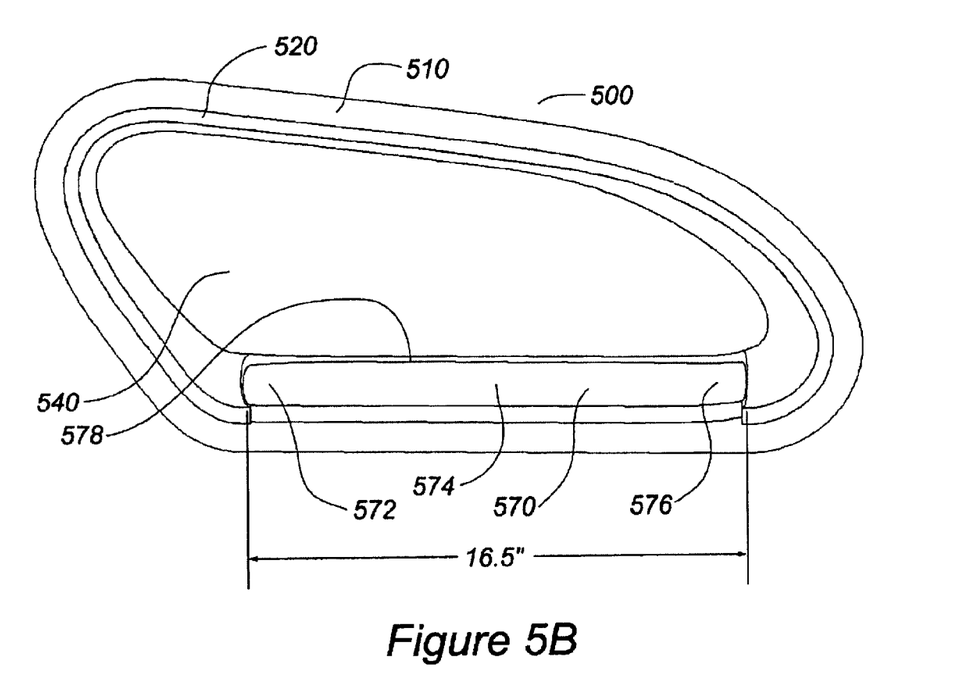
FIG. 5B presents a front view of the insert of FIG. 5A.
Figure 5C:
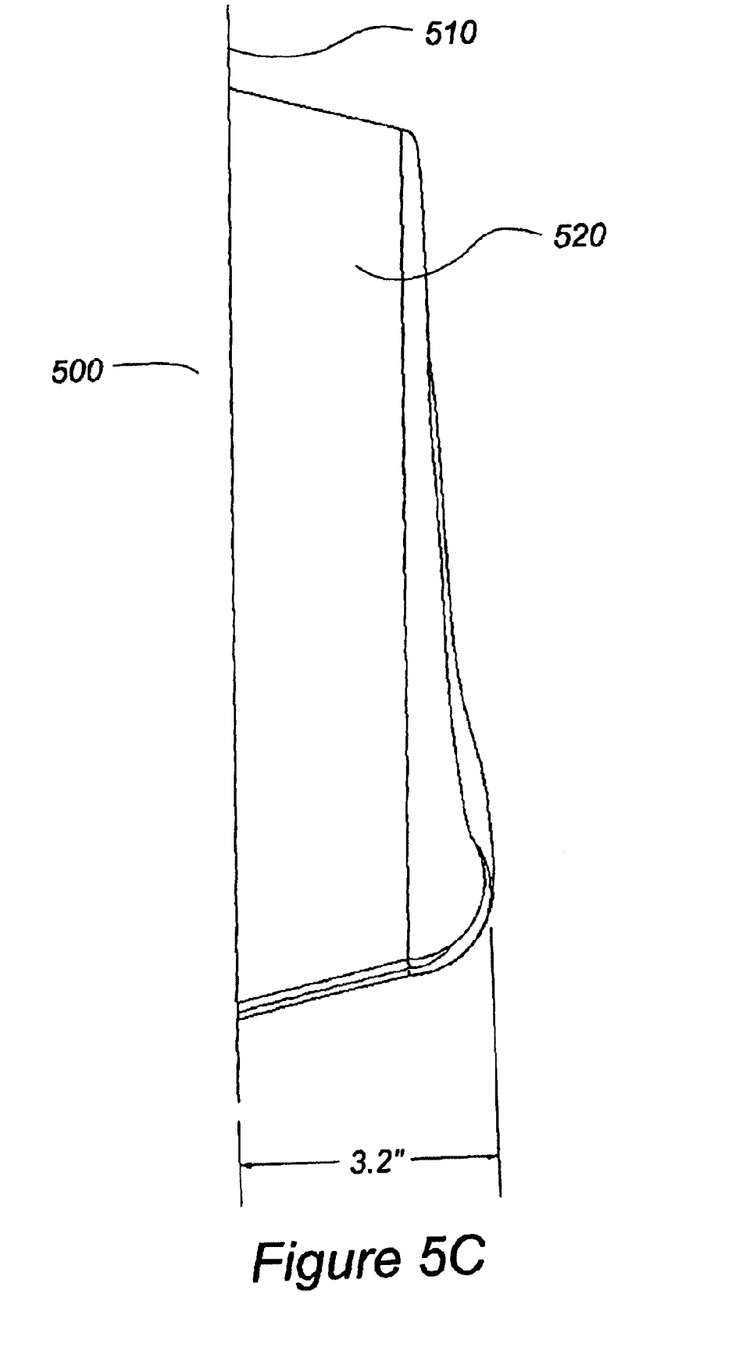
FIG. 5C presents a side view of the insert of FIG. 5A.

Some embodiments of the invention utilize an insert that does not include a recessed portion. One such insert is shown in FIGS. 5A through 5C. The insert 500 includes a flange 510 that is designed to couple to the rear surface of an aircraft interior panel. Just inside the flange 510, the panel contains a protruding portion 520 that is designed to fit within an opening in an aircraft interior panel. The protruding portion 520 has a height that is typically larger than the height of the protruding portion 320 of insert 300.

The insert 500 also includes a cavity 570 for receiving the armrest shown in FIG. 2. As shown in FIG. 5B, in some embodiments of the invention, the cavity 570 has a length of 16.5 inches. In other embodiments of the invention, the length of the cavity 570 is between 13 and 24 inches. In still other embodiments of the invention, the cavity 570 has a width of 3.2 inches. In other embodiments of the invention, the width of the cavity 570 is between 2 and 6 inches.

The cavity 570 may have a tapered rear portion 572, a center portion 574, and a tapered forward portion 576. In addition, the cavity 570 may include an upper surface 578. In some embodiments of the invention (not shown) the upper surface 578 of the insert includes a cutout for receiving a finger grip (not shown). Such a cutout would be similar to the cutout 210 shown in the insert of FIG. 2. In other embodiments of the invention, such as shown in FIGS. 5A–5C, the upper surface 578 does not include a cutout for a finger grip.

The insert 500 can be molded from any moldable material, such as from many common plastics. Alternatively, the insert 500 can be constructed out of fiberglass, E-glass, S-glass, or carbon fiber.

In order to make the insert aesthetically pleasing to users of an aircraft, the insert may be covered with a covering such as leather.

Inserts without a recessed portion are particularly useful in aircraft that are manufactured by Cessna Airplane Company, New Piper Aircraft, Inc, Mooney Aerospace Group, LTD, and homebuilt aircraft with flat fuselage sides.

5.7 Conclusion

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. An armrest assembly for an aircraft comprising:
   an insert, the insert including a flange for coupling to an aircraft interior panel, a protruding portion, the protruding portion including a cavity, the cavity having a length greater than 12 inches and having a width greater than 2 inches; and
   an armrest, which is attached to the cavity, the armrest including an upper surface for supporting the arm of an aircraft pilot or passenger, the upper surface having a length that is greater than 12 inches and having a width that is greater than 2 inches;
   wherein the cavity includes an outer surface that faces the armrest and an inner surface that faces away from the armrest:
   wherein the armrest includes an outer surface that faces away from the insert and which includes the upper surface of the armrest:
   wherein the outer surface of the armrest when viewed from the rear of the armrest, does not contain a concave surface between the portion of the outer surface that supports the arm of the aircraft pilot or passenger and a vertical plane.

2. The armrest assembly of claim 1, wherein the protruding portion includes a tapered front protruding portion.

3. The armrest assembly of claim 1, wherein the length of the cavity is greater than the length of the armrest.

4. The armrest assembly of claim 1, wherein the insert is covered with a first material, the first material having a thickness, wherein the armrest is covered with a second material, the second material having a thickness, and wherein the length of the cavity is greater than the length of the armrest plus two times the thickness of the first material and two times the thickness of the second material.

5. The armrest assembly of claim 1, wherein the armrest has a thickness, wherein the depth of the cavity is greater than the thickness of the armrest.

6. The armrest assembly of claim 1, wherein the armrest has a thickness, wherein the armrest is covered with a first material, and wherein the depth of the cavity is greater than the thickness of the armrest plus the thickness of the material.

7. The armrest assembly of claim 1, wherein the armrest includes a molded part that has a thickness that is equal to or less than 0.1 inches.

8. The armrest assembly of claim 1, wherein the armrest includes a tapered forward portion.

9. The armrest assembly of claim 1, wherein the armrest includes a tapered rear portion.

10. The armrest assembly of claim 1, wherein the armrest includes a tapered forward portion and a tapered rear portion.

11. The armrest assembly of claim 1, wherein the armrest includes a cutout for receiving a finger grip.

12. The armrest assembly of claim 1, wherein the insert is covered with a covering.

13. The armrest assembly of claim 1, wherein the insert is covered with a first covering of a first color and the armrest is covered with a second covering of a second color.

14. The armrest assembly of claim 1, wherein the height of the protruding section is greater than or equal to 1 inch.

15. The armrest assembly of claim 1, wherein the height of the protruding section is greater than or equal to 3 inches.

16. The armrest assembly of claim 1, wherein the insert includes a molded part that has a thickness that is equal to or less than 0.1 inches.

17. The armrest assembly of claim 1, wherein the insert includes a recessed portion.

18. The armrest assembly of claim 1, wherein the insert does not include a recessed portion.

19. The armrest assembly of claim 1, wherein the armrest assembly is attached to a door panel in an aircraft manufactured by Raytheon Aircraft Company.

20. The armrest assembly of claim 1, wherein the armrest assembly is attached to a door panel in an aircraft manufactured by Cessna Aircraft Company.

21. The armrest assembly of claim 1, wherein a majority of the outer surface of the cavity is parallel to the inner surface of the cavity.

22. The armrest assembly of claim 1, wherein a majority of the outer surface of the cavity is parallel to the inner surface of the armrest.

* * * * *